United States Patent
Hsu et al.

(10) Patent No.: US 11,854,528 B2
(45) Date of Patent: Dec. 26, 2023

(54) METHOD AND SYSTEM FOR DETECTING UNSUPPORTED UTTERANCES IN NATURAL LANGUAGE UNDERSTANDING

(71) Applicant: SAMSUNG ELECTRONICS CO., LTD., Suwon-si (KR)

(72) Inventors: Yen-Chang Hsu, Fremont, CA (US); Yilin Shen, Santa Clara, CA (US); Avik Ray, Sunnyvale, CA (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 17/402,045

(22) Filed: Aug. 13, 2021

(65) Prior Publication Data
US 2022/0199070 A1    Jun. 23, 2022

Related U.S. Application Data

(60) Provisional application No. 63/129,415, filed on Dec. 22, 2020.

(51) Int. Cl.
*G06N 20/00* (2019.01)
*G10L 15/02* (2006.01)
*G10L 15/18* (2013.01)

(52) U.S. Cl.
CPC .............. *G10L 15/02* (2013.01); *G10L 15/18* (2013.01)

(58) Field of Classification Search
None
See application file for complete search history.

(56) References Cited

U.S. PATENT DOCUMENTS

| 5,822,728 | A | * | 10/1998 | Applebaum | ............ | G10L 15/08 |
| | | | | | | 704/254 |
| 8,645,137 | B2 | * | 2/2014 | Bellegarda | .............. | G10L 17/14 |
| | | | | | | 704/250 |

(Continued)

FOREIGN PATENT DOCUMENTS

| CN | 108304468 A | 7/2018 |
| CN | 105632501 B | 9/2019 |

(Continued)

OTHER PUBLICATIONS

I. Lane, T. Kawahara, T. Matsui and S. Nakamura, "Out-of-Domain Utterance Detection Using Classification Confidences of Multiple Topics," in IEEE Transactions on Audio, Speech, and Language Processing, vol. 15, No. 1, pp. 150-161, Jan. 2007, doi: 10.1109/TASL.2006.876727. (Year: 2007).*

(Continued)

*Primary Examiner* — Jakieda R Jackson
(74) *Attorney, Agent, or Firm* — Sughrue Mion, PLLC

(57) ABSTRACT

An apparatus for detecting unsupported utterances in natural language understanding, includes a memory storing instructions, and at least one processor configured to execute the instructions to classify a feature that is extracted from an input utterance of a user, as one of in-domain and out-of-domain (OOD) for a response to the input utterance, obtain an OOD score of the extracted feature, and identify whether the feature is classified as OOD. The at least one processor is further configured to executed the instructions to, based on the feature being identified to be classified as in-domain, identify whether the obtained OOD score is greater than a predefined threshold, and based on the OOD score being identified to be greater than the predefined threshold, re-classify the feature as OOD.

20 Claims, 11 Drawing Sheets

(56) References Cited

U.S. PATENT DOCUMENTS

| | | | |
|---|---|---|---|
| 9,922,664 B2 | 3/2018 | Sharma et al. | |
| 10,347,241 B1* | 7/2019 | Meng | G10L 15/16 |
| 10,726,830 B1* | 7/2020 | Mandal | G10L 15/16 |
| 10,824,818 B2 | 11/2020 | Peper et al. | |
| 11,081,106 B2 | 8/2021 | Lin et al. | |
| 11,574,628 B1* | 2/2023 | Kumatani | G06N 3/045 |
| 2016/0055240 A1* | 2/2016 | Tur | G06F 40/284 |
| | | | 707/706 |
| 2020/0005766 A1 | 1/2020 | Kim | |
| 2020/0082228 A1* | 3/2020 | Sen | G06F 18/2321 |
| 2020/0335108 A1* | 10/2020 | Meng | G10L 17/18 |
| 2021/0074266 A1 | 3/2021 | Lu et al. | |
| 2022/0067588 A1* | 3/2022 | Büttner | G06V 10/774 |

FOREIGN PATENT DOCUMENTS

| | | |
|---|---|---|
| CN | 110428843 A | 11/2019 |
| CN | 111967483 A | 11/2020 |
| EP | 3 564 948 A1 | 11/2019 |
| JP | 5170449 B2 | 3/2013 |

OTHER PUBLICATIONS

Yinhe Zheng; Guanyi Chen; Minlie Huang, Out-of-domain Detection for Natural Language Understanding in Dialog Systems, Mar. 22, 2020, https://arxiv.org/abs/1909.03862v3, IEEE/ACM Transactions on Audio, Speech, and Language Processing (Year: 2020).*

Ian Lane et al., "Out-of-Domain Utterance Detection Using Classification Confidences of Multiple Topics", IEEE Transactions on Audio, Speech, and Language Processing, vol. 15, No. 1, Dec. 19, 2006, pp. 150-161, 12 pages total.

Hong Xu et al., "A Deep Generative Distance-Based Classifier for Out-of-Domain Detection with Mahalanobis Space", Proceedings of the 28th International Conference on Computational Linguistics, Dec. 2020, pp. 1452-1460, 9 pages total.

International Search Report and Written Opinion dated Mar. 28, 2022 issued by the International Searching Authority in Application No. PCT/KR2021/019197 (PCT/ISA/220, PCT/ISA/210, and PCT/ISA/237).

* cited by examiner

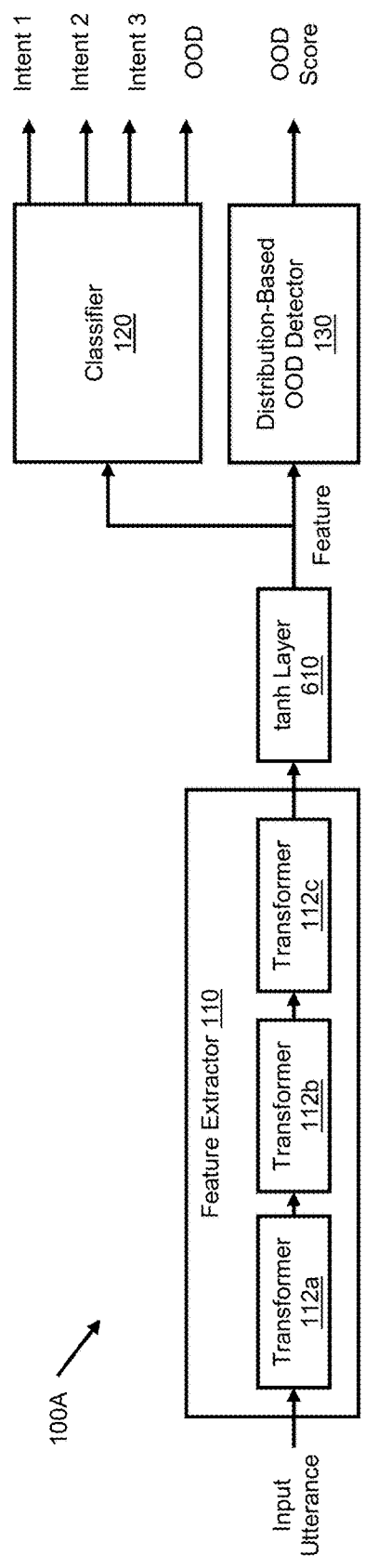
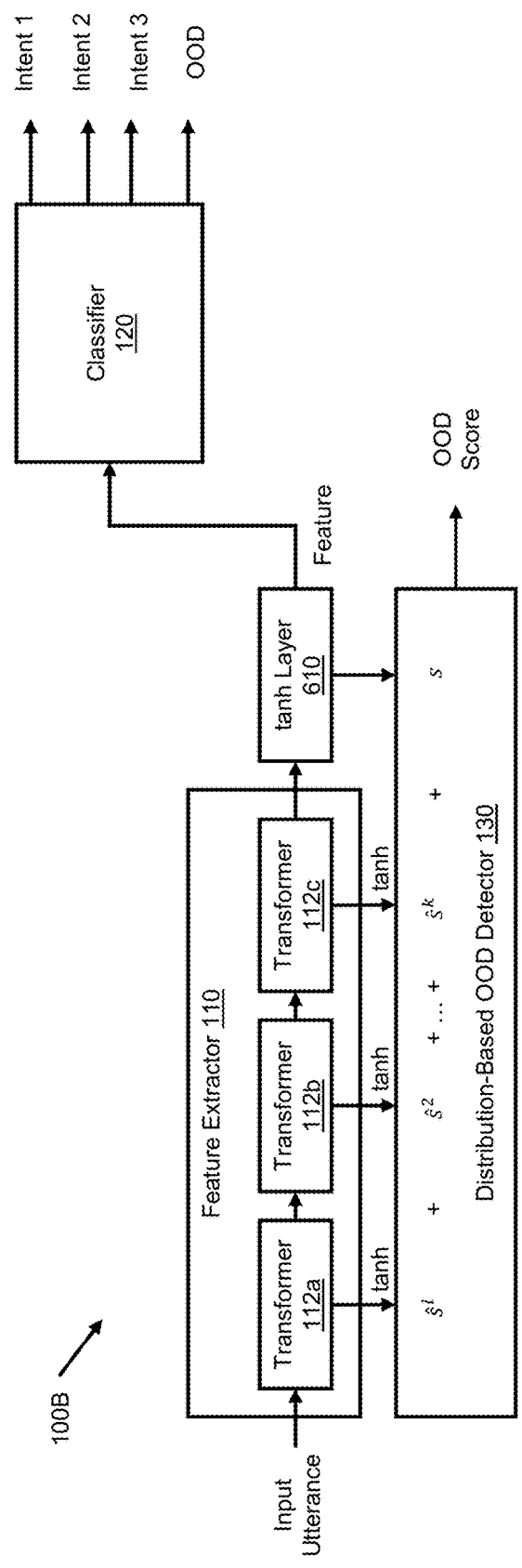
FIG. 6A
FIG. 6B

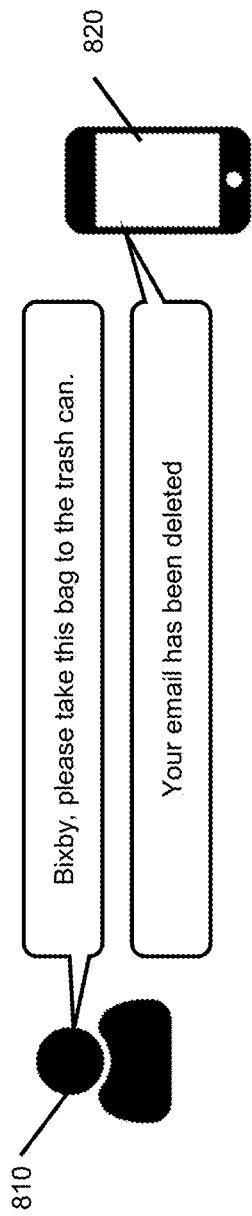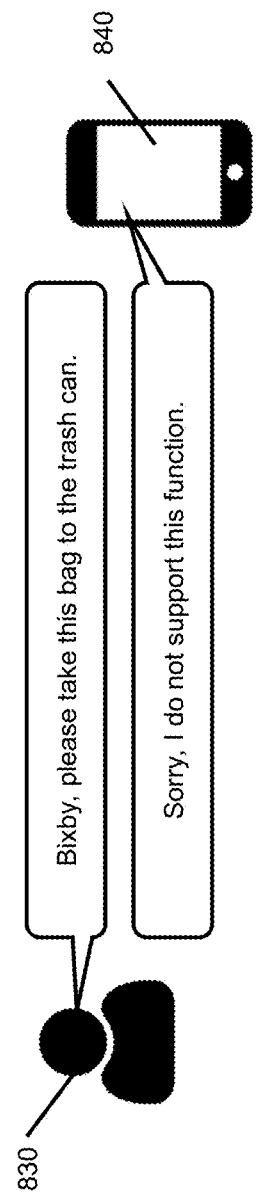

METHOD AND SYSTEM FOR DETECTING UNSUPPORTED UTTERANCES IN NATURAL LANGUAGE UNDERSTANDING

CROSS-REFERENCE TO RELATED APPLICATIONS

This application is based on and claims priority under 35 U.S.C. § 119 from U.S. Provisional Application No. 63/129,415 filed on Dec. 22, 2020, in the U.S. Patent and Trademark Office, the disclosure of which is incorporated by reference herein in its entirety.

BACKGROUND

1. Field

The disclosure relates to a method and an apparatus for detecting unsupported utterances in natural language understanding.

2. Description of Related Art

Spoken language understanding (SLU) systems play a crucial role in artificially intelligent voice-enabled personal assistants (PA). A classification system is an essential component of SLU to identify user intents. However, SLU needs to process a wide variety of user utterances in the open-world, while the supported domain of intents is predefined during the product development. The gap between the predefined and unstructured open-world utterances can significantly affect the user experience of interaction with a digital personal assistant. A desired behavior of the PA is to let the user know that the given utterance is out of the designed domain instead of forcefully classifying an utterance with a predefined intent. The latter case contributes to classification errors, compromising the SLU's robustness in open-world use.

Since the spoken language is unstructured, there are many ways for an AI personal assistant to go wrong with the language understanding. For example, an AI personal assistant may be forced to map the out-of-domain (OOD) utterances to a predefined capsule, making the responses look not smart and are inappropriate.

An AI personal assistant involves two stages to respond to user utterances. The first is the upper-stream task classification to identify user intent, and the second is the down-stream task handler to process the intent. The mistakes may be due to the errors in the first stage.

Previous methods use two strategies to detect OOD intents: (1) use the output class probability as the confidence to reject the low confident predictions; and (2) add an out-of-domain class to the classifier.

There are three problems involved in the two previous strategies. The discriminatively trained classifier in the first strategy tends to be overconfident. Rejecting an utterance based on confidence leads to a low accuracy. The second strategy needs out-of-domain data to be annotated by a human. However, the infinite compositionality of natural language makes collecting out-of-domain data very expensive. As a result, it is hard to collect enough out-of-domain data to train the classifier to detect such an ill-defined class. This issue is called the data selection bias. The resulting classifier can only reject those similar to the training data and cannot generalize to unseen out-of-domain data. The second strategy leads to user privacy concerns since the best practice uses the user's utterance history to collect the out-of-domain data. The collected user data are then sent to a server for training the model.

SUMMARY

In accordance with an aspect of the disclosure, there is provided an apparatus for detecting unsupported utterances in natural language understanding, the apparatus comprising a memory storing instructions, and at least one processor configured to execute the instructions to classify a feature that is extracted from an input utterance of a user, as one of in-domain and out-of-domain (OOD) for a response to the input utterance, obtain an OOD score of the extracted feature, and identify whether the feature is classified as OOD. The at least one processor is further configured to executed the instructions to, based on the feature being identified to be classified as in-domain, identify whether the obtained OOD score is greater than a predefined threshold, and based on the OOD score being identified to be greater than the predefined threshold, re-classify the feature as OOD.

In accordance with an aspect of the disclosure, there is provided a method of detecting unsupported utterances in natural language understanding, the method being performed by at least one processor, and the method comprising classifying a feature that is extracted from an input utterance of a user, as one of in-domain and out-of-domain (OOD) for a response to the input utterance, obtaining an OOD score of the extracted feature, and identifying whether the feature is classified as OOD. The method further includes, based on the feature being identified to be classified as in-domain, identifying whether the obtained OOD score is greater than a predefined threshold, and based on the OOD score being identified to be greater than the predefined threshold, re-classifying the feature as OOD.

In accordance with an aspect of the disclosure, there is provided a non-transitory computer-readable storage medium storing instructions that, when executed by at least one processor, cause the at least one processor to classify a feature that is extracted from an input utterance of a user, as one of in-domain and out-of-domain (OOD) for a response to the input utterance, obtain an OOD score of the extracted feature, and identify whether the feature is classified as OOD. The instructions, when executed by the at least one processor, further cause the least one processor to, based on the feature being identified to be classified as in-domain, identify whether the obtained OOD score is greater than a predefined threshold, and based on the OOD score being identified to be greater than the predefined threshold, re-classify the feature as OOD.

BRIEF DESCRIPTION OF THE DRAWINGS

The above and other aspects, features, and advantages of embodiments of the disclosure will be more apparent from the following description taken in conjunction with the accompanying drawings, in which:

FIGS. 6A and 6B are block diagrams illustrating apparatuses for detecting unsupported utterances in natural language understanding, in which extracted features are enhanced, according to embodiments;

FIGS. 8A, 8B and 9 are diagrams illustrating use cases of the apparatus of FIG. 1 in a voice-enabled personal assistant, according to embodiments;

DETAILED DESCRIPTION

A system according to embodiments of the present disclosure provides a distribution-based OOD detector and a unified arbitrator to expand a standard neural network-based classifier, solving the mentioned problems.

Figure 1:
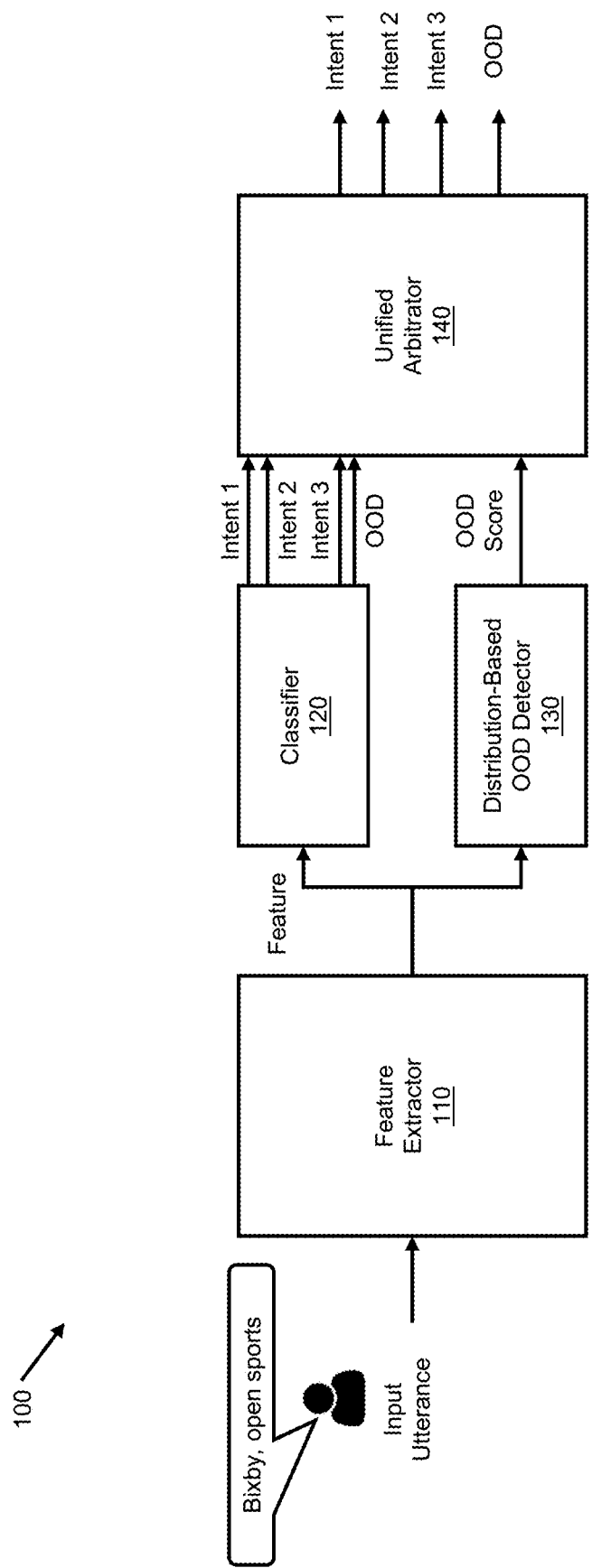
FIG. 1 is a block diagram illustrating an apparatus for detecting unsupported utterances in natural language understanding, according to embodiments.

FIG. 1 is a block diagram of an apparatus 100 for detecting unsupported utterances in natural language understanding, according to embodiments.

The apparatus 100 and any portion of the apparatus 100 may be included or implemented in a client device and/or a server device. The client device may include any type of electronic device, for example, a smartphone, a laptop computer, a personal computer (PC), a smart television and the like.

As shown in FIG. 1, the apparatus 100 includes a feature extractor 110, a classifier 120, a distribution-based OOD detector 130 and a unified arbitrator 140.

The feature extractor 110 extracts a feature from an input utterance of a user.

The classifier 120 classifies the extracted feature as one of in-domain and OOD for a response to the input utterance.

The distribution-based OOD detector 130 obtains an OOD score of the extracted feature. The OOD detector 130 is designed to reduce an overconfidence issue of the classifier 120. The OOD detector 130 assumes in-domain data forms Gaussian distributions, and outputs the OOD score based on a distance between input data and the Gaussian distributions. The Gaussian assumption avoids the overconfidence issue in the discriminatively-learned classifier 120.

The unified arbitrator 140 identifies whether the feature is classified as OOD. Based on the feature being identified to be classified as in-domain, the unified arbitrator 140 identifies whether the obtained OOD score is greater than a predefined threshold. Based on the OOD score being identified to be greater than the predefined threshold, the unified arbitrator 140 re-classifies the feature as OOD.

The two-branch (the classifier 120 and the OOD detector 130) design needs predictions to be combined. Therefore, the unified arbitrator 140 is added to allow the OOD detector 130 to work together with any classifier that supports an OOD class or not.

Figure 2A:
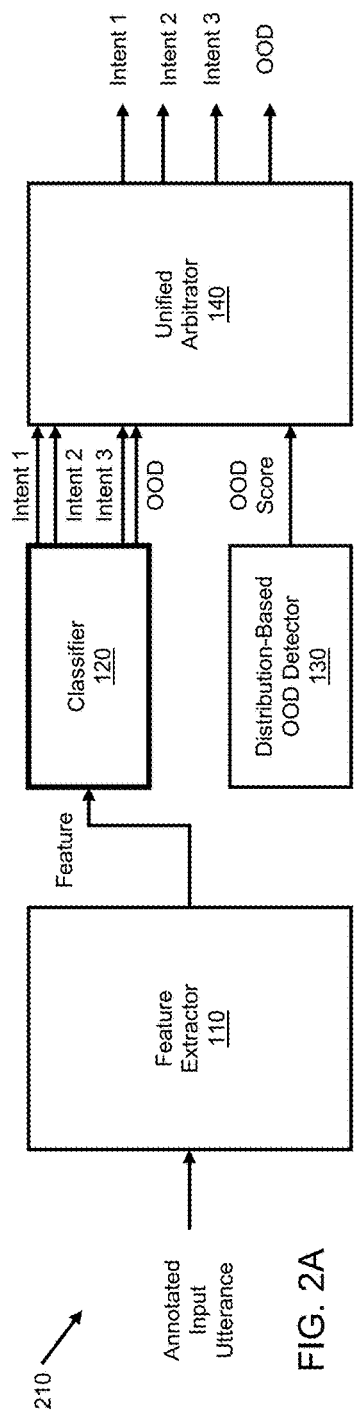
FIGS. 2A, 2B and 2C are block diagrams illustrating a training of the apparatus of FIG. 1, according to embodiments.
Figure 2B:
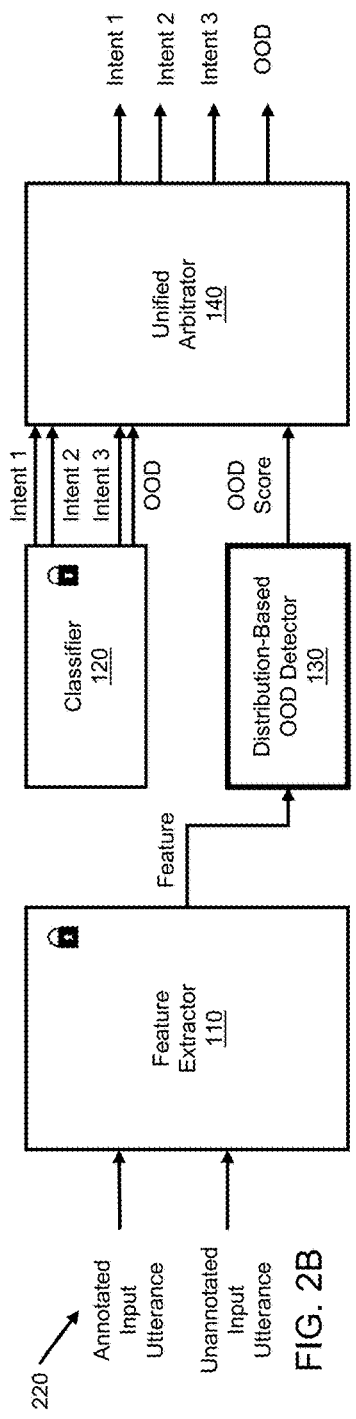
Figure 2C:
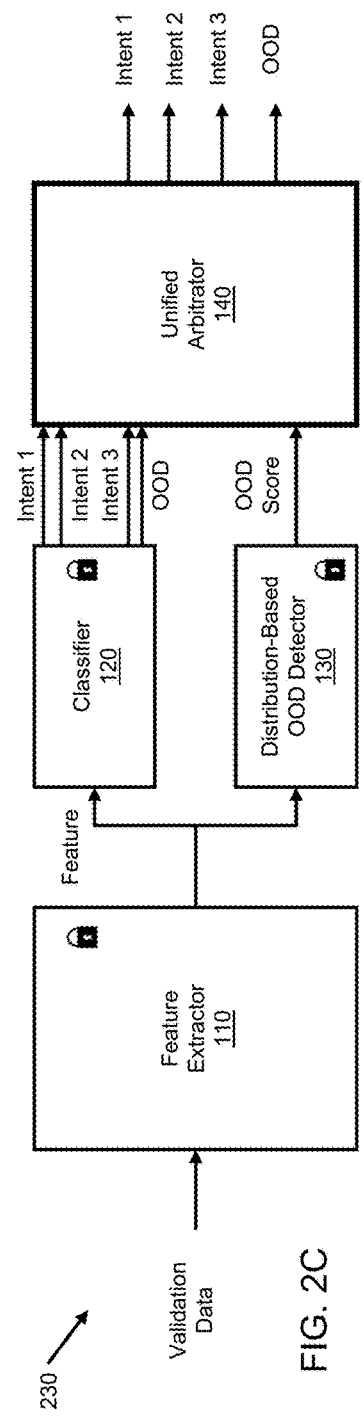

FIGS. 2A, 2B and 2C are block diagrams illustrating a training of the apparatus 100 of FIG. 1, according to embodiments.

As shown in FIG. 2A, in operation 210, the classifier 120 is first trained by inputting at least one annotated input utterance into the feature extractor 110. The at least one annotated input utterance may include in-domain data and/or optional OOD data. The feature extractor 110 extracts at least one feature from the at least one annotated input utterance, and inputs the extracted at least one feature into the classifier 120 to train the classifier 120.

As shown in FIG. 2B, in operation 220, parameters of the distribution-based OOD detector 130 are computed without updating the feature extractor 110 and the classifier 120. The parameters of the distribution-based OOD detector 130 are computed by inputting the at least one annotated input utterance and at least one unannotated input utterance into the feature extractor 110. The at least one unannotated input utterance includes in-domain data and OOD data. The computing of the parameters of the distribution-based OOD detector 130 will be further described with respect to FIG. 3A.

As shown in FIG. 2C, in operation 230, parameters of the unified arbitrator 140 are decided without updating the feature extractor 110, the classifier 120 and the distribution-based OOD detector 130. The parameters of the unified arbitrator 140 are decided by inputting hold-out validation data into the feature extractor 110. The validation data includes in-domain data and OOD data. The deciding of the parameters of the unified arbitrator 140 will be further described below.

The distribution-based OOD detector 130 only requires in-domain data to compute parameters of Gaussian distributions (mean and covariance). Learning of the OOD detector 130 does not need annotated OOD data at all, avoiding an issue of data selection bias. As will be further described with respect to FIG. 3A, a way of learning the covariance is changed, making the covariance be learnt from unannotated data. This is achieved by using the classifier 120 to predict pseudo-labels on the unannotated data instead of relying on ground-truth class labels from annotated data.

Figure 3A:
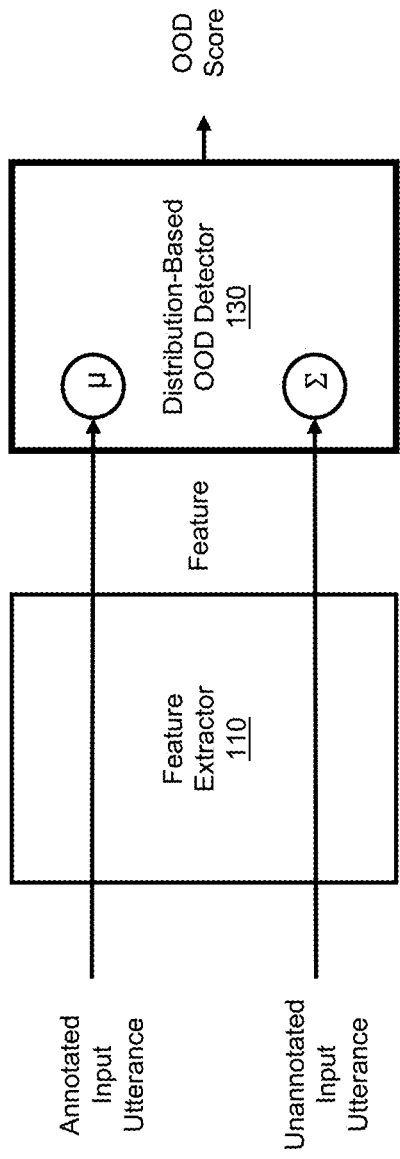
FIG. 3A is a diagram illustrating a training of a distribution-based OOD detector of the apparatus of FIG. 1, according to embodiments.
Figure 3B:
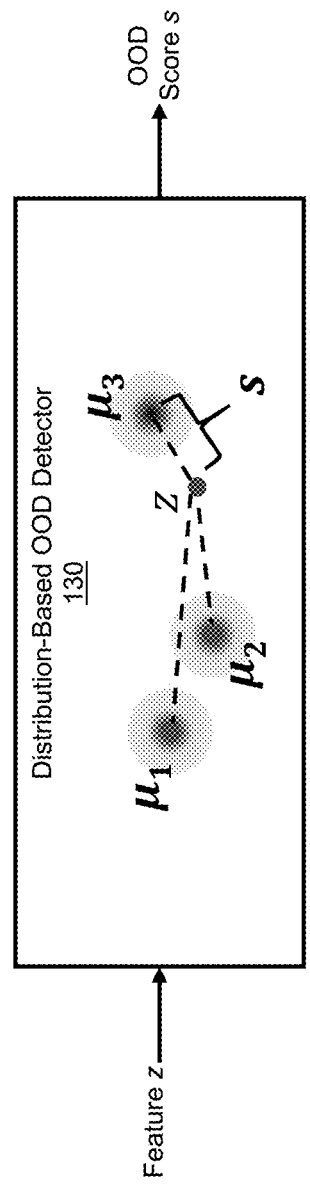
FIG. 3B is a diagram illustrating an example of the distribution-based OOD detector, according to embodiments.

Learning of the OOD detector 130 is lightweight and can be performed directly on a user device without sending out its data, as will be further described with respect to FIG. 3B.

FIG. 3A is a diagram illustrating a training of the distribution-based OOD detector 130 of the apparatus 100 of FIG. 1, according to embodiments.

As shown in FIG. 3A, to compute parameters of the distribution-based OOD detector 130, annotated in-domain utterances $X_{in}$ and unannotated utterances $X_{un}$ are fed into the feature extractor 110 to collect their features $Z_{in}$ and $Z_{un}$, respectively. In examples, $X_{in}$ is a set of annotated in-domain inputs. An example of such input is "read new email." $X_{un}$ is a set of unannotated inputs. An example of such input is "Can you repair my watch?" $Z_{in}$ is a set of feature vectors. Each vector is a 512-dimension real-valued array z, e.g., z=[1.1, 0.2, −0.6, . . . , 0.1]. $Z_{un}$ is also a set of feature vectors. Each vector is a 512-dimension real-valued array z, e.g., z=[−0.4, 2.1, 0.1, . . . , 0.9].

Next, for each in-domain class, a class mean $$\mu_c = \frac{1}{N_c}\sum_{z \in Z_{in}}$$

z is computed for each class c. In examples, z is a 512-dimension real-valued array (e.g., [1.1, 0.2, −0.6, . . . , 0.1]), $\mu_c$ is a 512-dimension real-valued array (e.g., [−0.4, 2.1, 0.1, . . . , 0.9]), and $N_c$ is an amount of data in a class c. For example, if a first class has 800 utterances, then $N_1$=800.

Then, the classifier 120 f is used to assign a pseudo-label $y_i$=argmax$_c f_c(z_i)$ if $f_c(z_i)>\theta_{pseudo}$, otherwise $y_i$=null. This process applies to all unannotated utterances $z_i \in Z_{un}$. Note that $f_c$ is a softmax output for a class c and $f_c$=P($y_i$=c|$z_i$).

A global covariance matrix $\Sigma_g$ is computed with all $z_i$ that have a non-null pseudo-label:

$$\Sigma_g = \frac{1}{N}\sum_c \sum_{i:y_i=c}(z_i-\mu_c)(z_i-\mu_c)^T\right].$$

Unannotated data helps to improve the OOD detector 130 due to two reasons. First, data diversity in the unannotated data can better capture an actual data distribution, leading to a better covariance matrix. Second, a covariance is not sensitive to pseudo-labels' noisy predictions. Therefore, benefits outweigh drawbacks.

In examples, $\mu_c$ is a 512-dimension real-valued vector, e.g., [2.3, −0.7, −0.9, . . . , −0.8], and $\Sigma_g$ is a 512×512 real-valued 2-D matrix.

A computation of a global covariance matrix can include an annotated utterance (a ground-truth for $y_i$).

No neural network training is involved in computing parameters of the distribution-based OOD detector 130.

Computing parameters of the distribution-based OOD detector 130 does not use an individual covariance for each class. A global covariance matrix assumes all classes have a similar shape of a feature distribution, which reduces computation for an inference and is robust against cases with small classes (which contain only few data).

$\theta_{pseudo}$ is predetermined. $\theta_{pseudo}$ may be zero. That means all pseudo-labels are used without selection.

FIG. 3B is a diagram illustrating an example of the distribution-based OOD detector 130, according to embodiments.

To output an OOD score s at a testing time, an input utterance x is fed into the feature extractor 110 to obtain a feature z.

As shown in FIG. 3B, the distribution-based OOD detector 130 computes an OOD score, based on an equation S(z)=min$_c$ (z−$\mu_c$)$^T\Sigma_g^{-1}$(z−$\mu_c$)=s. Referring to FIG. 3B, clusters represent classes, and balls are visualizations of $\Sigma_g$. If the OOD score s is small, it means the feature z is likely to belong to one of in-domain classes.

The distribution-based OOD detector 130 sends the OOD score s to the unified arbitrator 140 for determining whether the input utterance x is OOD, based on a threshold. In an example, s is a real-valued number that is greater or larger than zero. If the feature z is from OOD data, the OOD score will be larger.

Referring again to FIGS. 1-2C, a main feature of the unified arbitrator 140 is to allow the apparatus 100 to use both labeled OOD data and unlabeled data for OOD detection. Specifically, the labeled OOD data (as an OOD class) is used in training the classifier 120, while the unlabeled data is used in training the distribution-based OOD detector 130. The unified arbitrator 140 combines OOD signals output from both modules to make a final judgment. Prior arts do not have this arbitrator; thus, they cannot utilize both types (labeled and unlabeled) of data to build a system.

Figure 4:
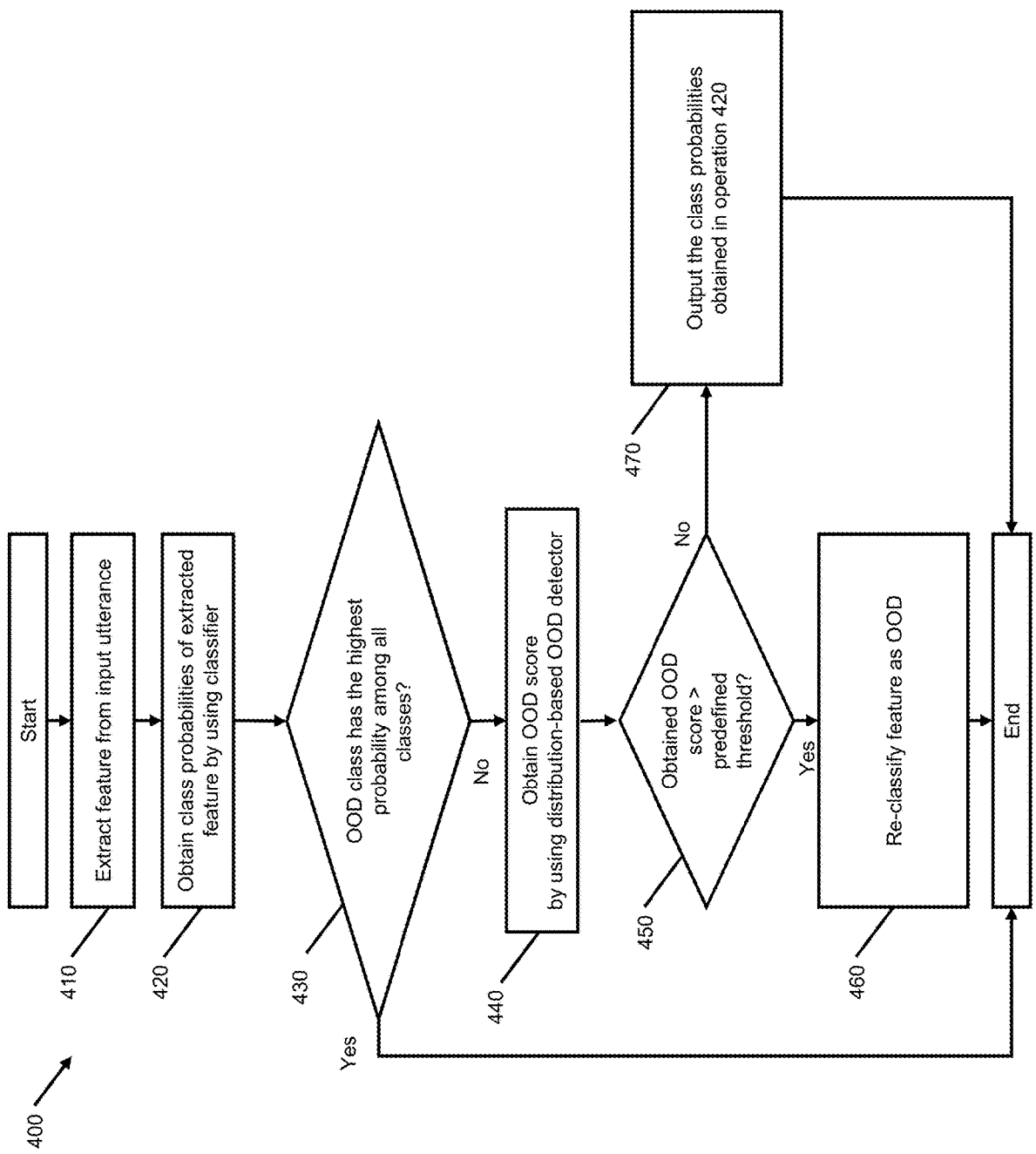
FIG. 4 is a flowchart illustrating a method of detecting unsupported utterances in natural language understanding, according to embodiments.

FIG. 4 is a flowchart illustrating a method of detecting unsupported utterances in natural language understanding, according to embodiments.

The method 400 may be performed by at least one processor using the apparatus 100 of FIG. 1, namely, the unified arbitrator 140.

As shown in FIG. 4, in operation 410, the method 400 includes extracting a feature from an input utterance of a user.

In operation 420, the method 400 includes obtaining class probabilities of the extracted feature by using the classifier 120. The class probabilities may represent probabilities that the extracted feature belongs to each of a plurality of different classes (e.g., in-domain classes and an OOD class), including for example, a first probability that the extracted feature belongs to a first in-domain class, a second probability that the extracted feature belongs to a second in-domain class, and a third probability that the extracted feature belongs to the OOD class.

In operation 430, the method 400 includes identifying whether the feature is classified as OOD class. For example, the feature is classified as OOD class when the ODD class has the highest probability among all cases. Based on the feature being identified to be classified as OOD, the method 400 ends, e.g., by outputting an indication that the feature is classified as OOD. Based on the feature being identified to be classified as in-domain classes, the method continues in operation 440. In embodiments, the identifying whether the features are classified as OOD may include checking whether the classifier 120 has an OOD class.

In operation 440, the method 400 includes obtaining an OOD score by using the distribution-based OOD detector 130.

In operation 450, the method includes identifying whether the obtained OOD score is greater than a predefined threshold θOOD. Based on the OOD score being identified to be greater than the predefined threshold, the method 400 continues in operation 460. Otherwise, the method 400 continues in operation 470. In embodiments, the predefined threshold may be selected by a validation dataset, based on product requirement.

For example, if a product wants 95% of in-domain data to be correctly judged as in-domain, it can follow the following steps to predefine the predefined threshold $\theta_{OOD}$. Once three training stages in FIGS. 2A-2C are completed, OOD scores s are computed for all the in-domain data in a validation set. The OOD scores are sorted, and a value at a 95% percentile is selected for the predefined threshold $\theta_{OOD}$. That means 95% of the in-domain data has an OOD score less than the predefined threshold $\theta_{OOD}$.

In operation 460, the method 400 includes re-classifying the feature as OOD.

In operation 470, the method 400 includes outputting the class probabilities of the extracted feature that are obtained in operation 420.

Figure 5A:
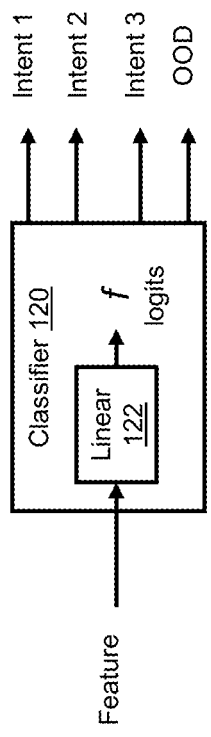
FIGS. 5A and 5B are block diagrams illustrating examples of a classifier of the apparatus of FIG. 1, according to embodiments.
Figure 5B:
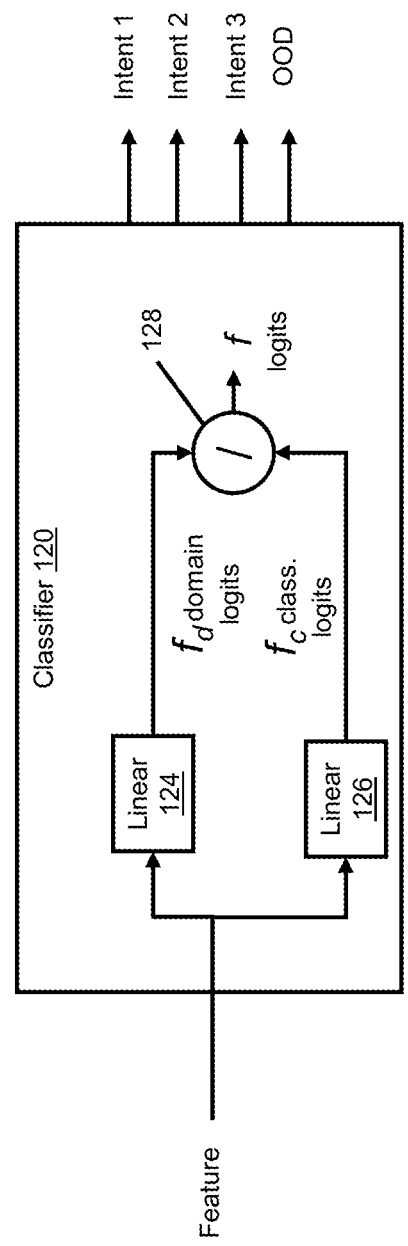

FIGS. 5A and 5B are block diagrams illustrating examples of the classifier 120 of the apparatus of FIG. 1, according to embodiments.

The classifier 120 of each of FIGS. 5A and 5B enhances a feature representation for the OOD detector 130.

As shown in FIG. 5A, the classifier 120 includes a linear layer 122 that obtains f logits to be used for classification, from an input feature. The regularized classifier 120 generates a more generalizable feature, which is also a better input for the distribution-based OOD detector 130.

As shown in FIG. 5B, the classifier 120 includes linear layers 124 and 126 and a divider 128. The linear layers 124 and 126 obtains $f_d$ domain logits and $f_c$ classification logits, respectively, from an input feature. The divider 128 divides the $f_c$ classification logits by the $f_d$ domain logits to obtain a f logits to be used for classification.

The classifier 120 improves an input feature via adding a regularization when training the classifier 120 and the feature extractor 110 in the training as described in FIG. 2A. In detail, a split classifier regularization enhances an intermediate feature representation for the distribution-based OOD detector 130 by introducing a domain variable-based regularization term to the classifier 120.

A design is motivated by a probabilistic formulation that introduces a domain variable (d=1 means in-domain, while d=0 means OOD). Then, a posterior of class y given x with domain d is rewritten as follows:

$$\hat{p}(y \mid d=1, x) = \frac{\hat{p}(y, d=1 \mid x)}{\hat{p}(d=1 \mid x)} \quad (1)$$

$$= \frac{\hat{p}(y \mid x)}{\hat{p}(d=1 \mid x)} - \frac{\hat{p}(y, d=0 \mid x)}{\hat{p}(d=1 \mid x)}$$

$$\approx \frac{\hat{p}(y \mid x)}{\hat{p}(d=1 \mid x)}.$$

The classifier 120 has a dividend/divisor structure similar to Equation (1) by creating two branches ($f_d$ and $f_c$) for it. A domain loss $\mathcal{L}$ domain then regularizes the $f_d$ branch since it is trained with in-domain data. The $\mathcal{L}_{domain}$ is summed with $\mathcal{L}_{classification}$ (i.e., a cross-entropy loss) for optimizing the classifier 120 as follows:

$f = f_c / f_d$ $\mathcal{L}_{domain} \triangleq (1 - \text{sigmoid}(f_d))^2$, $\mathcal{L}_{classification} = -y^* \log(\text{softmax}(f))$ $$\mathcal{L} = \mathcal{L}_{classification} + \mathcal{L}_{domain} \quad (2)$$

where y* is a ground-truth class label in a format of an on-hot vector.

FIGS. 6A and 6B are block diagrams illustrating apparatuses 100A and 100B for detecting unsupported utterances in natural language understanding, in which extracted features are enhanced, according to embodiments.

Each of the apparatuses 100A and 100B enhances an intermediate feature representation for the OOD detector 130.

Each of the apparatuses 100A and 100B normalizes and merges features from multiple intermediate layers of the classifier 120 to guarantee a bounded range, thus enhancing intermediate feature representation for the distribution-based OOD detector 130.

Specifically, a function (n) tan h is added to normalize features from different transformer layers 112a, 112b and 112c and a tan h layer 610 before sending it to the OOD detector 130. The function (n) can be a unary operation or a small neural network. The function (n) may be a tan h function, where the feature extractor 110 is based on a transformer architecture. The tan h function ensures a bounded range of values; therefore, it improves a merged score for detecting OOD data.

These embodiments may be applied to operations 220 and 230 of the training of FIGS. 2B and 2C, respectively.

An $OOD_{score}$ combines a score s from a last layer and $\hat{s}^l$ from hidden layers (k hidden layers) as follows:

$$\mu_c^l = \frac{1}{N_c} \sum_{h^l} n(h^l) \quad (3)$$

$$\hat{s}^l = \min_c (n(h^l) - \mu_c^l)^T \Sigma_g^{-1} (n(h^l) - \mu_c^l)$$

$$OOD_{score} = s + \sum_{l=1}^{k} \hat{s}^l$$

Note that a choice of layers is flexible, and it is not necessary to include all layers. A hidden feature output from layer l may be denoted as $h^l$.

Figure 7:
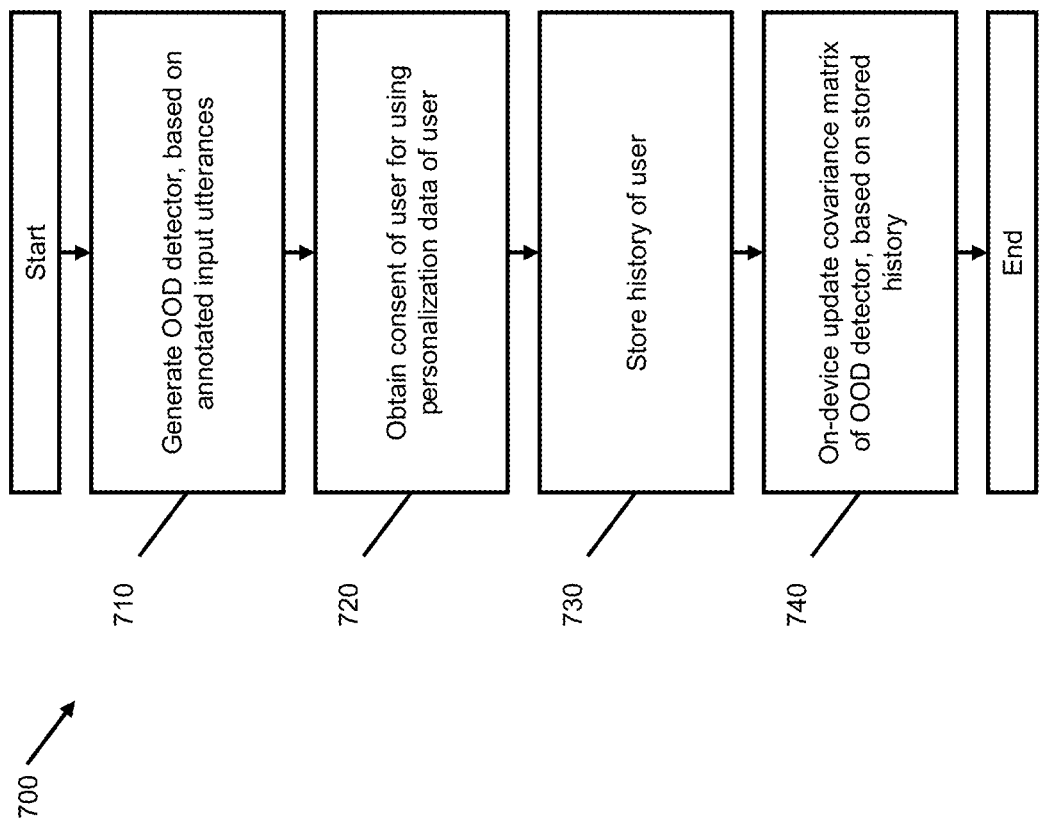
FIG. 7 is a flowchart illustrating a method of an on-device continuous training of the distribution-based OOD detector of the apparatus of FIG. 1, according to embodiments.

FIG. 7 is a flowchart illustrating a method 700 of an on-device continuous training of the distribution-based OOD detector 130 of the apparatus 100 of FIG. 1, according to embodiments.

The method 700 may be performed by at least one processor using the apparatus 100 of FIG. 1. The at least one processor may be implemented in an electronic or mobile device.

As shown in FIG. 7, in operation 710, the method 700 includes generating parameters of the OOD detector 130, based on annotated input utterances, as detailed with respect to FIG. 3A. The default parameters of the OOD detector 130 are then delivered to one or more devices. An initial global variance may be denoted as $\Sigma_g^{init}$.

In operation 720, the method 700 includes obtaining consent of a user of one of the one or more devices, for using personalization data of the user. For example, a mobile device may request permission from the user to use their data to improve service. The mobile device may let the user know that the data will be only stored in the mobile device and will not be sent out.

In operation 730, the method 700 includes storing history of the user. For example, the mobile device may store a history of user utterances in memory. The stored history may further include one or more intermediate feature representations extracted by the feature extractor 110 and predictions output by the classifier 120. Storing the outputs may save computation of learning in operation 740 below.

In operation 740, the method 700 includes on-device updating of a covariance matrix of the OOD detector 130, based on the stored history of the user. For example, once an increased number of stored utterances exceeds a predefined threshold $\theta_{update}$ (for example, $\theta_{update}=1000$), the mobile device may compute the new covariance matrix with an exponential moving average $\Sigma_g = (1-\alpha)\Sigma_g^{init} + \alpha\Sigma_g^{user}$, in which $\Sigma_g^{user}$ is computed as described with respect to FIG. 3A. An example value for $\alpha$ is 0.9.

The method 700 does not need any user annotation of utterances. Thus, a personalization process is transparent to users.

Figure 9:
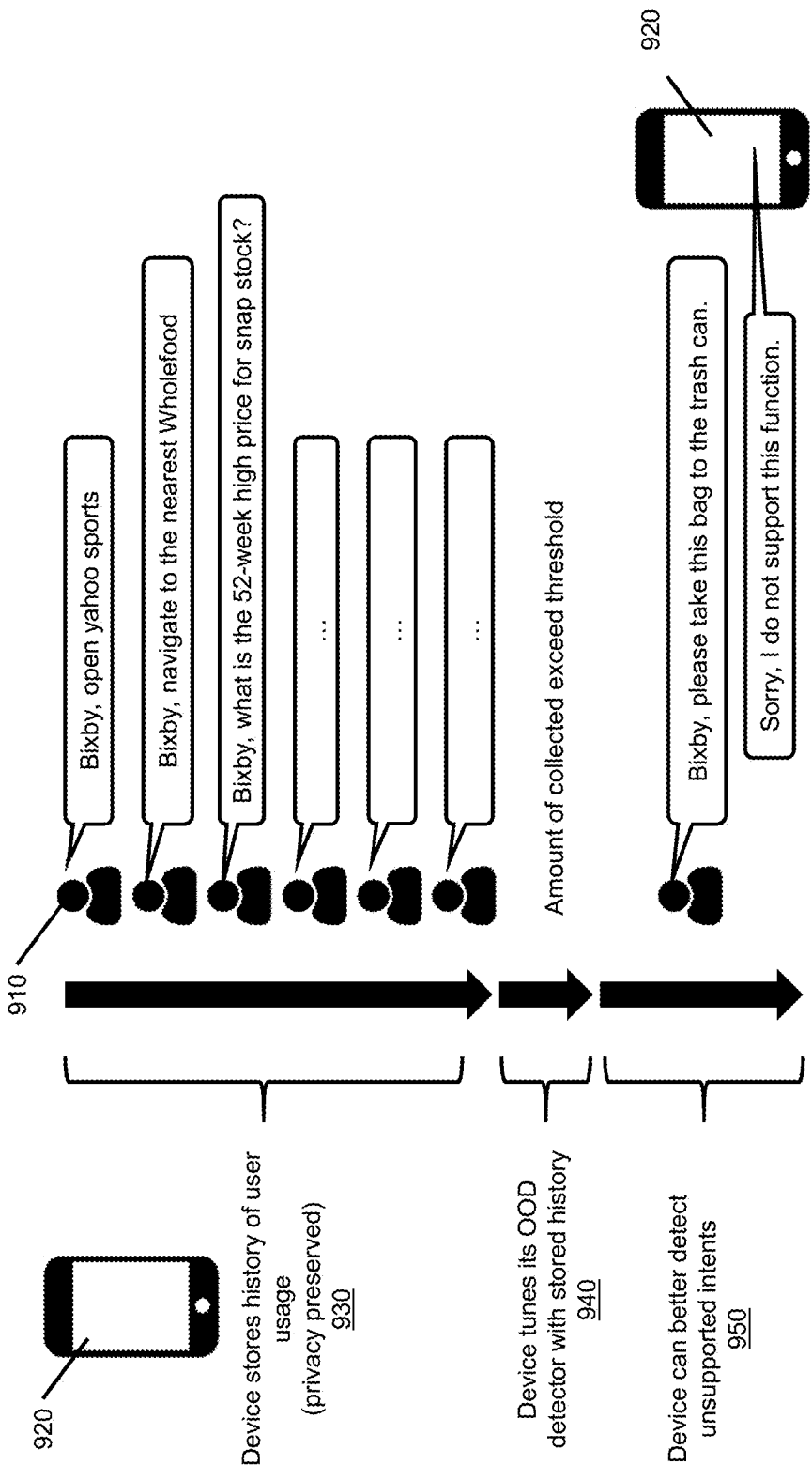

FIGS. 8A, 8B and 9 are diagrams illustrating use cases of the apparatus 100 of FIG. 1 in a voice-enabled personal assistant, according to embodiments.

Using the apparatus 100 of FIG. 1, the voice-enabled personal assistant installed in an electronic or mobile device may detect when an intent of a user is out of a designed domain. A response of the assistant will be based on a detection result.

As shown in FIG. 8A, a user 810 is using a voice-enabled personal assistant included in an electronic device 820 without a robust OOD detector. Accordingly, the assistant is forced to respond with an action defined in in-domain intents that is not consistent with an input utterance of the user 810.

As shown in FIG. 8B, a user 830 is using a voice-enabled personal assistant included in an electronic device 840 with a robust OOD detector, e.g., the distribution-based OOD detector 130 of FIG. 1. Accordingly, the assistant knows when to use a fallback handler to address an out-of-domain intent that is consistent with an input utterance of the user 810.

FIG. 9 shows a user 910 using on-device fast adaptation for a voice-enabled personal assistant included in an electronic device 920, as similarly described with respect to FIG. 7. As shown in FIG. 9, in operation 930, the electronic device 920 stores a history of user usage, in which privacy is preserved. In operation 940, the electronic device 920 tunes its OOD detector (e.g., the distribution-based OOD detector 130 of FIG. 1) with the stored history. In operation 950, the electronic device 920 can better detect unsupported intents and respond better to an input utterance of the user 910.

Accordingly, an OOD detector may adapt to a user's utterance with very lightweight computation. Further, a wrongly-responded OOD intent may be appropriately addressed after adapting to a user's data, and the above-described process does not need to send the user's data out to a server, which protects a user's privacy.

Figure 10:
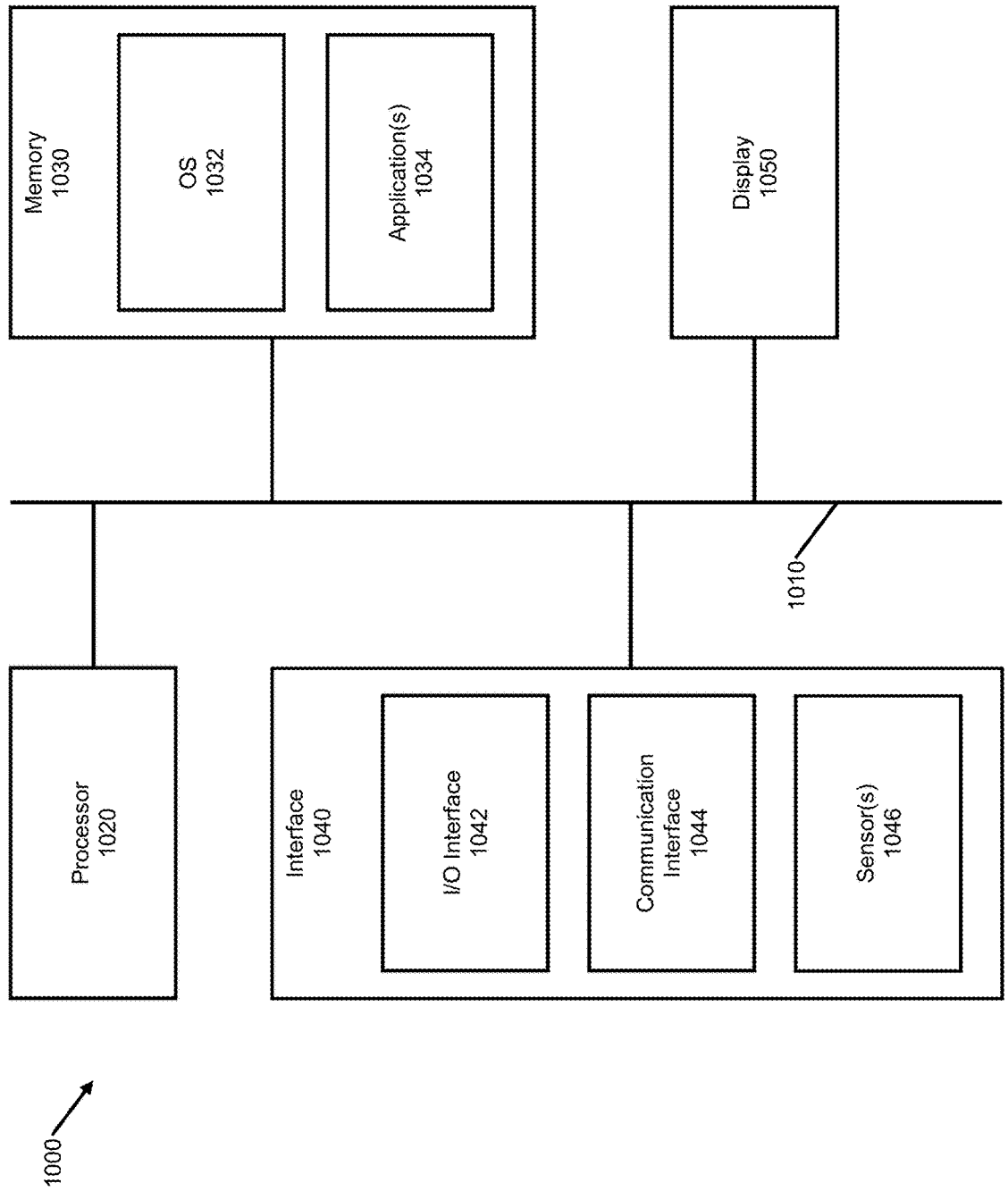
FIG. 10 is a block diagram of an electronic device in which the apparatus of FIG. 1 is implemented, according to embodiments.

FIG. 10 is a block diagram of an electronic device 1000 in which the apparatus 100 of FIG. 1 is implemented, according to embodiments.

FIG. 10 is for illustration only, and other embodiments of the electronic device 1000 could be used without departing from the scope of this disclosure.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

The applications 1034 include the above-discussed embodiments. These functions can be performed by a single application or by multiple applications that each carry out one or more of these functions.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The sensor(s) 1046 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, and a fingerprint sensor. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000. The sensors 1046 may be used to detect touch input, gesture input, and hovering input, using an electronic pen or a body portion of a user, etc.

Figure 11:
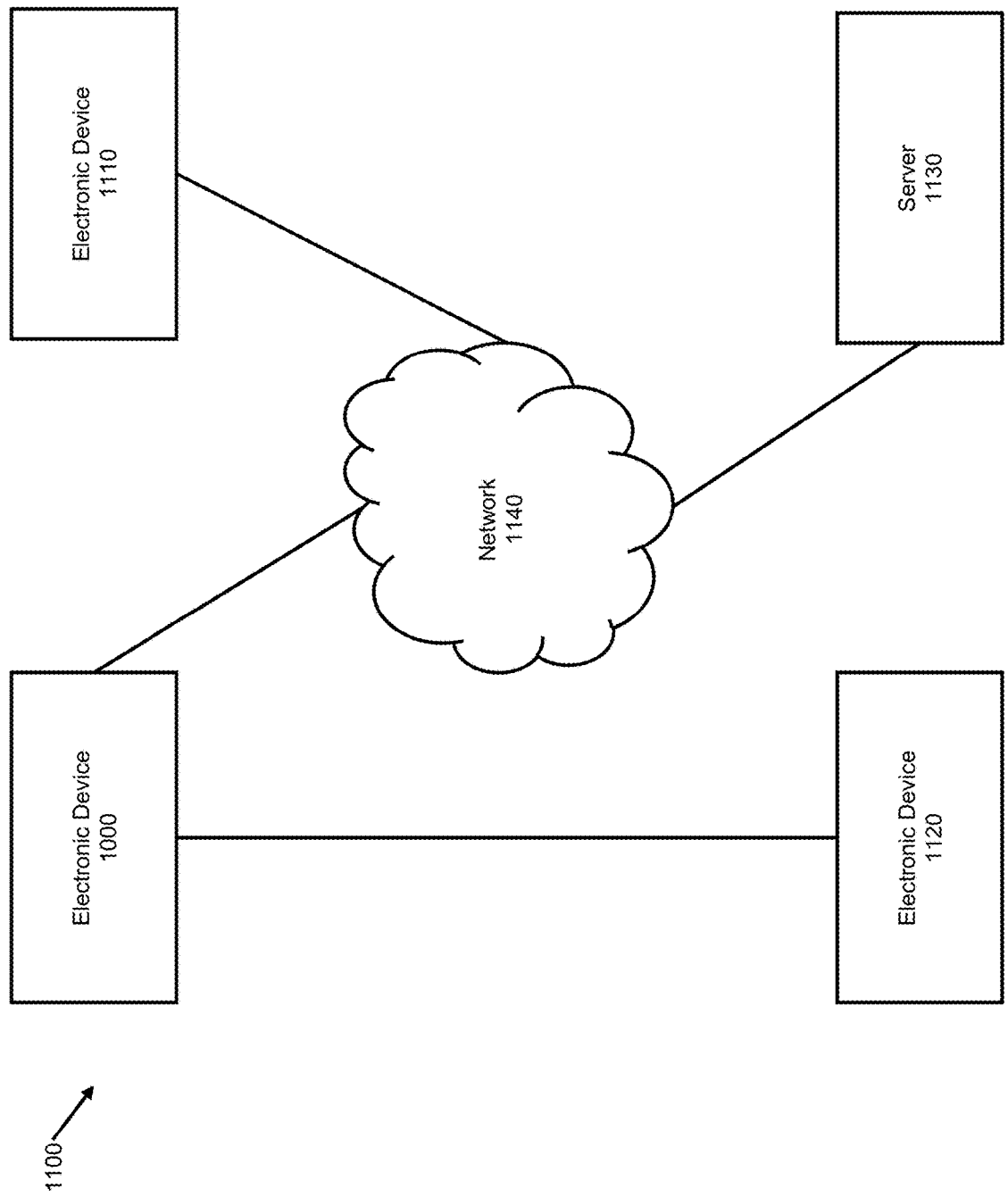
FIG. 11 is a diagram of a system in which the apparatus of FIG. 1 is implemented, according to embodiments.

The communication interface 1044, for example, is able to set up communication between the electronic device 1000 and an external electronic device, such as a first electronic device 1110, a second electronic device 1120, or a server 1130 as illustrated in FIG. 11. Referring to FIGS. 10 and 11, the communication interface 1044 can be connected with a network 1140 through wireless or wired communication architecture to communicate with the external electronic device. The communication interface 1044 can be a wired or wireless transceiver or any other component for transmitting and receiving signals.

FIG. 11 is a diagram of a system 1100 in which the apparatus 100 of FIG. 1 is implemented, according to embodiments.

The electronic device 1000 of FIG. 10 is connected with the first external electronic device 1110 and/or the second external electronic device 1120 through the network 1140. The electronic device 1000 can be a wearable device, an electronic device-mountable wearable device (such as an HMD), etc. When the electronic device 1000 is mounted in the electronic device 1120 (such as the HMD), the electronic device 1000 can communicate with electronic device 1120 through the communication interface 1044. The electronic device 1000 can be directly connected with the electronic device 1120 to communicate with the electronic device 1120 without involving a separate network. The electronic device 1000 can also be an augmented reality wearable device, such as eyeglasses, that include one or more cameras.

The first and second external electronic devices 1110 and 1120 and the server 1130 each can be a device of the same or a different type from the electronic device 1000. According to embodiments, the server 1130 includes a group of one or more servers. Also, according to embodiments, all or some of the operations executed on the electronic device 1000 can be executed on another or multiple other electronic devices, such as the electronic devices 1110 and 1120 and/or the server 1130). Further, according to embodiments, when the electronic device 1000 performs some function or service automatically or at a request, the electronic device 1000, instead of executing the function or service on its own or additionally, can request another device (such as the electronic devices 1110 and 1120 and/or the server 1130) to perform at least some functions associated therewith. The other electronic device (such as the electronic devices 1110 and 1120 and/or the server 1130) is able to execute the requested functions or additional functions and transfer a result of the execution to the electronic device 1000. The electronic device 1000 can provide a requested function or service by processing the received result as it is or additionally. To that end, a cloud computing, distributed computing, or client-server computing technique may be used, for example. While FIGS. 10 and 11 show that the electronic device 1000 includes the communication interface 1044 to communicate with the external electronic device 1110 and/or 1120 and/or the server 1130 via the network 1140, the electronic device 1000 may be independently operated without a separate communication function according to embodiments.

The server 1130 can include the same or similar components 1010-1050 as the electronic device 1000, or a suitable subset thereof. The server 1130 can support the drive of the electronic device 1000 by performing at least one of a plurality of operations or functions implemented on the electronic device 1000. For example, the server 1130 can include a processing module or processor that may support the processor 1020 implemented in the electronic device 1000.

The wireless communication is able to use any one or any combination of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), and global system for mobile communication (GSM), as a cellular communication protocol. The wired connection can include, for example, any one or any combination of a universal serial bus (USB), a high definition multimedia interface (HDMI), a recommended standard 232 (RS-232), and a plain old telephone service (POTS). The network 1140 includes at least one communication network, such as a computer network (like a local area network (LAN) or wide area network (WAN)), the Internet, or a telephone network.

Although FIG. 11 illustrates one example of the system 1100 including the electronic device 1000, the two external electronic devices 1110 and 1120, and the server 1130, various changes may be made to FIG. 11. For example, the system 1100 could include any number of each component in any suitable arrangement. In general, computing and communication systems come in a wide variety of configurations, and FIG. 11 does not limit the scope of this disclosure to any particular configuration. Also, while FIG. 11 illustrates one operational environment in which various features disclosed in this patent document, can be used, these features could be used in any other suitable system.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 1130.

A model related to the CNN described above may be implemented via a software module. When the CNN model is implemented via a software module (for example, a program module including instructions), the CNN model may be stored in a computer-readable recording medium.

Also, the CNN model may be a part of the apparatus 100 described above by being integrated in a form of a hardware chip. For example, the CNN model may be manufactured in a form of a dedicated hardware chip for artificial intelligence, or may be manufactured as a part of an existing general-purpose processor (for example, a CPU or application processor) or a graphic-dedicated processor (for example a GPU).

Also, the CNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for detecting unsupported utterances in natural language understanding, the apparatus comprising:
   a memory storing instructions; and
   at least one processor configured to execute the instructions to:
   classify a feature that is extracted from an input utterance of a user, as one of in-domain and out-of-domain (OOD) for a response to the input utterance, via a trained neural network-based classifier;
   obtain an OOD score of the extracted feature via a distribution-based OOD detector, based on a distance between the extracted feature and distributions of a predetermined distribution function;

based on the feature being classified as in-domain via the trained neural network-based classifier, identify whether the OOD score of the feature is greater than a predefined threshold; and based on the OOD score being greater than the predefined threshold, re-classify the feature, which is classified as in-domain via the trained neural network-based classifier, as OOD.

2. The apparatus of claim 1, wherein the at least one processor is further configured to execute the instructions to obtain the OOD score of the feature, based on a class mean and a global covariance, the class mean is trained based on annotated utterances that are annotated by at least one user and are in-domain, and the global covariance is trained based on the trained class mean and unannotated utterances that are unannotated by the at least one user and are in-domain and OOD.

3. The apparatus of claim 2, wherein the at least one processor is further configured to execute the instructions to classify the extracted feature as one of in-domain and OOD for the response to the input utterance, using the trained neural network-based classifier that is trained based on the annotated utterances, and the neural network-based classifier is trained prior to the class mean and the global covariance being trained.

4. The apparatus of claim 2, wherein the predefined threshold is trained based on one or more OOD scores of validation data that is in-domain, and the predefined threshold is trained after the class mean and the global covariance being trained.

5. The apparatus of claim 2, wherein the at least one processor is further configured to obtain consent of the user, for using personalization data of the user.

6. The apparatus of claim 5, wherein the at least one processor is further configured to execute the instructions to, based on the consent of the user being obtained, store history of the user, the history comprising one or more utterances of the user.

7. The apparatus of claim 6, wherein the at least one processor is further configured to execute the instructions to update the global covariance, based on the stored history.

8. A method of detecting unsupported utterances in natural language understanding, the method being performed by at least one processor, and the method comprising:

classifying a feature that is extracted from an input utterance of a user, as one of in-domain and out-of-domain (OOD) for a response to the input utterance, via a trained neural network-based classifier;

obtaining an OOD score of the extracted feature via a distribution-based OOD detector, based on a distance between the extracted feature and distributions of a predetermined distribution function;

based on the feature being classified as in-domain via the trained neural network-based classifier, identifying whether the OOD score of the feature is greater than a predefined threshold; and based on the OOD score being identified to be greater than the predefined threshold, re-classifying the feature, which is classified as in-domain via the trained neural network-based classifier, as OOD.

9. The method of claim 8, wherein the obtaining the OOD score comprises obtaining the OOD score of the feature, based on a class mean and a global covariance, the class mean is trained based on annotated utterances that are annotated by at least one user and are in-domain, and the global covariance is trained based on the trained class mean and unannotated utterances that are unannotated by the at least one user and are in-domain and OOD.

10. The method of claim 9, wherein the classifying the extracted feature comprises classifying the extracted feature as one of in-domain and OOD for the response to the input utterance, using the trained neural network-based classifier that is trained based on the annotated utterances, and the trained neural network-based classifier is trained prior to the class mean and the global covariance being trained.

11. The method of claim 9, wherein the predefined threshold is trained based on one or more OOD scores of validation data that is in-domain, and the predefined threshold is trained after the class mean and the global covariance being trained.

12. The method of claim 9, further comprising obtaining consent of the user, for using personalization data of the user.

13. The method of claim 12, further comprising, based on the consent of the user being obtained, storing history of the user, the history comprising one or more utterances of the user.

14. The method of claim 13, further comprising updating the global covariance, based on the stored history.

15. A non-transitory computer-readable storage medium storing instructions that, when executed by at least one processor, cause the at least one processor to:

classify a feature that is extracted from an input utterance of a user, as one of in-domain and out-of-domain (OOD) for a response to the input utterance, via a trained neural network-based classifier;

obtain an OOD score of the extracted feature via a distribution-based OOD detector, based on a distance between the extracted feature and distributions of a predetermined distribution function;

based on the feature being classified as in-domain via the trained neural network-based classifier, identify whether the OOD score of the feature is greater than a predefined threshold; and based on the OOD score being identified to be greater than the predefined threshold, re-classify the feature, which is classified as in-domain via the trained neural network-based classifier, as OOD.

16. The non-transitory computer-readable storage medium of claim 15, wherein the instructions, when executed by the at least one processor, further cause the at least one processor to obtain the OOD score of the feature, based on a class mean and a global covariance, the class mean is trained based on annotated utterances that are annotated by at least one user and are in-domain, and the global covariance is trained based on the trained class mean and unannotated utterances that are unannotated by the at least one user and are in-domain and OOD.

17. The non-transitory computer-readable storage medium of claim 16, wherein the instructions, when executed by the at least one processor, further cause the at least one processor to classify the extracted feature as one of in-domain and OOD for the response to the input utterance, using the trained neural network-based classifier that is trained based on the annotated utterances, and the neural network-based classifier is trained prior to the class mean and the global covariance being trained.

18. The non-transitory computer-readable storage medium of claim 16, wherein the predefined threshold is trained based on one or more OOD scores of validation data that is in-domain, and the predefined threshold is trained after the class mean and the global covariance being trained.

19. The non-transitory computer-readable storage medium of claim 16, wherein the instructions, when executed by the at least one processor, further cause the at least one processor to obtain consent of the user, for using personalization data of the user.

20. The non-transitory computer-readable storage medium of claim 19, wherein the instructions, when executed by the at least one processor, further cause the at least one processor to:
  based on the consent of the user being obtained, store history of the user, the history comprising one or more utterances of the user; and
  update the global covariance, based on the stored history.

* * * * *